US010100753B2

(12) United States Patent
Saito et al.

(10) Patent No.: US 10,100,753 B2
(45) Date of Patent: Oct. 16, 2018

(54) CONTROL DEVICE FOR SUPERCHARGED ENGINE

(71) Applicant: TOYOTA JIDOSHA KABUSHIKI KAISHA, Toyota-shi, Aichi-ken (JP)

(72) Inventors: Yusuke Saito, Susono (JP); Noriyasu Adachi, Numazu (JP); Akira Eiraku, Numazu (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 44 days.

(21) Appl. No.: 15/047,012

(22) Filed: Feb. 18, 2016

(65) Prior Publication Data
US 2016/0245191 A1 Aug. 25, 2016

(30) Foreign Application Priority Data

Feb. 20, 2015 (JP) ................................. 2015-031915

(51) Int. Cl.
*F02B 33/40* (2006.01)
*F02B 37/22* (2006.01)
(Continued)

(52) U.S. Cl.
CPC ........... *F02D 17/02* (2013.01); *F01N 13/107* (2013.01); *F02B 33/40* (2013.01); *F02B 37/001* (2013.01);
(Continued)

(58) Field of Classification Search
CPC ...... F01N 13/107; F02B 33/40; F02B 37/001; F02B 37/007; F02B 37/22; F02B 37/18;
(Continued)

(56) References Cited

U.S. PATENT DOCUMENTS 5,845,495 A 12/1998 Schray et al.
7,028,678 B2 4/2006 Betz et al.
(Continued)

FOREIGN PATENT DOCUMENTS

EP 1557549 A2 7/2005
JP S62-76252 U 5/1987
(Continued)

OTHER PUBLICATIONS

US Patent and Trademark Office, Notice of Allowance in U.S. Appl. No. 14/693,253 dated Oct. 27, 2017, 30 pages.
(Continued)

*Primary Examiner* — Brandon Lee
(74) *Attorney, Agent, or Firm* — Hunton Andrews Kurth LLP

(57) ABSTRACT

In a multiple cylinder supercharged engine, when reduced cylinder operation is executed, a throttle, which is located downstream of a compressor driven by a turbine provided in an exhaust passage, through which exhaust gas of a cylinder group flows, is operated to a fully closed state, wherein the reduced cylinder operation is applied to the cylinder group. A fuel injection amount of at least one cylinder included in the cylinder group is made smaller than a fuel injection amount of a cylinder included in another cylinder group, and this at least one cylinder is operated, in order to increase rotational speed of the compressor, so that a value of pressure of an upstream side of the throttle is controlled to a value, which is equal to or larger than a value of pressure of a downstream side of the throttle.

5 Claims, 4 Drawing Sheets

(51) Int. Cl.

| | | |
|---|---|---|
| *F02D 17/02* | (2006.01) | |
| *F02D 23/02* | (2006.01) | |
| *F02D 41/00* | (2006.01) | |
| *F02D 41/30* | (2006.01) | |
| *F01N 13/10* | (2010.01) | |
| *F02B 37/00* | (2006.01) | |
| *F02B 37/007* | (2006.01) | |
| *F02D 13/06* | (2006.01) | |
| *F02D 41/18* | (2006.01) | |
| *F02B 37/18* | (2006.01) | |
| *F02M 26/06* | (2016.01) | |

(52) U.S. Cl.
CPC ............ *F02B 37/007* (2013.01); *F02B 37/22* (2013.01); *F02D 13/06* (2013.01); *F02D 23/02* (2013.01); *F02D 41/0007* (2013.01); *F02D 41/0087* (2013.01); *F02D 41/3005* (2013.01); *F02B 37/18* (2013.01); *F02D 41/187* (2013.01); *F02D 2041/0012* (2013.01); *F02D 2200/0406* (2013.01); *F02M 26/06* (2016.02); *Y02T 10/144* (2013.01); *Y02T 10/18* (2013.01)

(58) Field of Classification Search
CPC .......... F02D 13/06; F02D 17/02; F02D 23/02; F02D 41/0007; F02D 41/0087; F02D 41/3005; F02D 2041/0012; F02D 2200/0406; F02D 41/187; F02M 26/06; Y02T 10/144; Y02T 10/18

See application file for complete search history.

(56) References Cited

U.S. PATENT DOCUMENTS

| | | |
|---|---|---|
| 2007/0163258 A1 | 7/2007 | Narita et al. |
| 2008/0216788 A1 | 9/2008 | Henrich et al. |
| 2011/0265454 A1* | 11/2011 | Smith ............... F01N 3/0842 60/274 |
| 2013/0167528 A1 | 7/2013 | Schlund et al. |
| 2014/0366529 A1 | 12/2014 | Komatsu |

FOREIGN PATENT DOCUMENTS

| | | |
|---|---|---|
| JP | H11-509908 A | 8/1999 |
| JP | 2005-207398 A | 8/2005 |
| JP | 2005-291020 A | 10/2005 |
| JP | 2005-344707 A | 12/2005 |
| JP | 2006-307677 A | 11/2006 |
| JP | 2006-322335 A | 11/2006 |
| JP | 2009-250068 A | 10/2009 |
| JP | 2010-038077 A | 2/2010 |
| JP | 2010-106787 A | 5/2010 |
| JP | 2012-180822 A | 9/2012 |
| JP | 2012-188994 A | 10/2012 |
| JP | 2013-096372 A | 5/2013 |
| WO | 2006/123760 A1 | 11/2006 |

OTHER PUBLICATIONS

Notice of Allowance dated Feb. 22, 2018; issued by the U.S. Patent and Trademark Office in U.S. Appl. No. 14/693,253; 7 pages.
Corrected Notice of Allowability dated Mar. 15, 2018; issued by the U.S. Patent and Trademark Office in U.S. Appl. No. 14/693,253; 2 pages.

* cited by examiner

CONTROL DEVICE FOR SUPERCHARGED ENGINE

The entire disclosure of Japanese Patent Application No. 2015-031915, filed on Feb. 20, 2015 including specification, claims, drawings and summary, on which the Convention priority of the present application is based, is incorporated herein by reference in its entirety.

BACKGROUND OF THE DISCLOSURE

Field of the Disclosure

The present application relates to a control device for a supercharged engine, and particularly relates to the control device for the supercharged engine capable of reduced cylinder operation (cylinder cutoff operation) that stops operation of one or more cylinders of the engine.

Description of the Related Art

Japanese Patent Laid-Open No. 2006-307677 and Japanese Patent Laid-Open No. 2009-250068 as follows disclose arts relating to control of supercharged engines capable of reduced cylinder operation. Further, each of the supercharged engines disclosed in these patent applications includes a plurality of intake passages in which compressors are placed, and a common intake passage (a surge tank) formed by combining the intake passages.

The supercharged engine described in Japanese Patent Laid-Open No. 2006-307677 is a V12 engine including six cylinders in each of a left and a right bank. The six cylinders in each of the banks are grouped into two cylinder groups, each cylinder group is formed of three cylinders, and four cylinder groups in total are created. Four turbochargers in total are provided, one for each of the cylinder groups. The compressors of the respective turbochargers are placed in four intake passages which are independently provided. The four intake passages join in one surge tank, and the surge tank is commonly used among all cylinders. A turbine of each of the turbochargers is placed in an exhaust manifold that is provided for each of the cylinder groups.

In the supercharged engine described in Japanese Patent Laid-Open No. 2006-307677 and having a configuration as described above, the reduced cylinder operation is performed in each of the cylinder groups as a unit. However, since the four cylinder groups commonly use one surge tank, there is a fear that backflow of air through the compressor corresponding to the cylinder group will occur, to which the reduced cylinder operation is applied, depending on a pressure condition when the engine is switched to reduced cylinder operation. In this regard, in the supercharged engine, one of the conditions required for executing the reduced cylinder operation is a pressure condition under which, pressure of a downstream side of the compressor is equal to or lower than predetermined minimum pressure, that is, the backflow does not occur even if the operation is switched to the reduced cylinder operation.

According to the reduced cylinder operation, equal torque can be realized by fewer cylinders. Therefore, thermal efficiency of the engine as a whole is enhanced, and fuel efficiency can be enhanced. Consequently, enlarging an operating region in which the reduced cylinder operation is performed is desired from a viewpoint of fuel efficiency performance.

However, since the supercharged engine described in Japanese Patent Laid-Open No. 2006-307677 has the pressure condition as described above, the reduced cylinder operation cannot be performed in a high load region in which supercharging pressure is high. That is to say, the operating region in which the reduced cylinder operation can be performed is restricted, and the effect of increasing fuel efficiency by reduced cylinder operation cannot be sufficiently obtained. A similar problem can also arise in the supercharged engine described in Japanese Patent Laid-Open No. 2009-250068.

SUMMARY

The present application is made in the light of the problem as described above, and has an object to provide a control device for a supercharged engine that restrains backflow of air from occurring in a part of an intake passage due to reduced cylinder operation, and is capable of performing the reduced cylinder operation in a wide operation range.

The control device for the supercharged engine according to the present application is applied to a supercharged engine that has a plurality of cylinders that are grouped into a plurality of cylinder groups, and is configured to be able to execute the reduced cylinder operation that stops fuel injection with respect to a part of the cylinder groups, and stops at least one of the intake valves and exhaust valves of said part of the cylinder groups, in a closed state. In more detail, the supercharged engine to which the control device according to the present application is applied includes a plurality of intake passages independently provided, and a common intake passage formed by gathering the plurality of intake passages. A same number of the intake passages as a number of the cylinder groups are provided, and the common intake passage is commonly used among the cylinder groups. Further, the supercharged engine includes a plurality of exhaust passages that have a one to one relationship with the cylinder groups. Compressors are respectively provided in the intake passages, and turbines are respectively provided in the exhaust passages. The compressors have a one to one relationship with the turbines, and each compressor is connected to its respective turbine. Throttles are provided downstream of the respective compressors in the respective intake passages.

The control device for the supercharged engine according to the present application includes a throttle operating portion for operating a specific throttle to a fully closed state when the reduced cylinder operation is executed. The specific throttle is a throttle located downstream of a compressor (specific compressor), said compressor is driven by a turbine (specific turbine), said turbine is provided in an exhaust passage (specific exhaust passage), exhaust gas of a cylinder group (specific cylinder group) flows through said exhaust passage, and the reduced cylinder operation is applied to said cylinder group. Further, the control device for the supercharged engine according to the present application includes a pressure control portion. When the reduced cylinder operation is executed, and if pressure of an upstream side of the specific throttle is smaller than pressure of a downstream side of the specific throttle, the pressure control portion makes an amount of the fuel injection with respect to at least one cylinder which is included in the specific cylinder group smaller than an amount of the fuel injection with respect to a cylinder which is included in the cylinder groups except the specific cylinder group, and operates said at least one cylinder, in order to increase exhaust gas energy which is supplied to the specific turbine and to increase rotational speed of the specific compressor, so that a value of the pressure of the upstream side of the specific throttle is controlled to a value, which is equal to or larger than a value of the pressure of the downstream side of the specific throttle.

According to the above described configuration, the rotational speed of the specific compressor is increased, and the value of the pressure of the upstream side of the specific throttle is controlled to the value, which is equal to or larger than the value of the pressure of the downstream side of the specific throttle. Accordingly, the air can be restrained from flowing back through the specific compressor. Note that in order to increase the pressure of the upstream side of the specific throttle, it is required to supply the specific turbine with large exhaust gas energy, and to increase the rotational speed of the specific compressor more. However, in order to prevent the backflow of air, the pressure of the upstream side of the specific throttle only needs to be equal to or greater than the pressure of the downstream side of the specific throttle. Consequently, the pressure control portion may control the value of the pressure of the upstream side of the specific throttle to the value which is substantially equal to the value of the pressure of the downstream side of the specific throttle.

Furthermore, according to the above described configuration, simultaneously, a flow rate of the air which passes through the specific throttle is restrained to a minimum by operating the specific throttle to the fully closed state, and therefore, energy necessary to increase the rotational speed of the specific compressor, that is, the exhaust gas energy which is supplied to the specific turbine, can be restrained to be low. That is to say, when the at least one cylinder which is included in the specific cylinder group is operated in order to increase the rotational speed of the specific compressor, a fuel injection amount thereof can be restrained to be low. Consequently, according to the above described configuration, the backflow of air can be restrained by increasing the rotational speed of the specific compressor while a fuel efficiency increasing effect by the reduced cylinder operation is maintained, and therefore, the reduced cylinder operation can be performed in a wide operating region.

The pressure control portion may be configured to operate a turbine rotation control actuator so that the exhaust gas energy supplied to the specific turbine reaches a maximum when the pressure control portion operates the at least one cylinder included in the specific cylinder group. The turbine rotation control actuator is an actuator that is provided in the specific exhaust passage, and regulates the exhaust gas energy supplied to the specific turbine. According to this configuration, use efficiency in the turbine of the exhaust gas energy which is obtained by operating the cylinder of the specific cylinder group is enhanced, and therefore, the fuel injection amount of the cylinder, which is operated, in the specific cylinder group can be further restrained to be lower.

The pressure control portion may be configured to regulate the amount of the fuel injection with respect to said at least one cylinder included in the specific cylinder group in accordance with a difference between a measured value of the pressure of the upstream side of the specific throttle and a target value, wherein the target value is set to be equal to or greater than the value of the pressure of the downstream side of the specific throttle. According to this configuration, the amount of fuel injection can be reduced to a required minimum amount that can restrain the backflow of air.

The pressure control portion may be configured to operate the at least one cylinder included in the specific cylinder group when the pressure of the downstream side of the specific throttle is equal to or greater than ambient pressure, and continue to stop operation of all cylinders included in the specific cylinder group when the pressure of the downstream side of the specific throttle is less than the ambient pressure. According to this configuration, the cylinder, which the reduced cylinder operation is applied to, is not operated wastefully, and therefore, fuel efficiency can be enhanced.

As described above, according to the control device for the supercharged engine of the present application, backflow of air is restrained from occurring in part of the intake passage due to the reduced cylinder operation, and the reduced cylinder operation can be performed in a wide operating region.

DETAILED DESCRIPTION OF THE PREFERRED EMBODIMENTS

Hereinafter, an embodiment of the present application will be described with reference to the drawings. Note that when the values of numbers, quantities, amounts, ranges and the like of the respective elements are mentioned in the embodiment shown as follows, the present application is not limited to the mentioned values unless specially explicitly described otherwise, or unless the application is explicitly specified by the values theoretically. Further, structures, steps and the like that are described in the embodiment shown as follows are not always indispensable to embodiments of the present application unless specially explicitly shown otherwise, or unless the embodiments are explicitly specified by them theoretically.

1. Configuration of Engine System of an Embodiment

Figure 1:
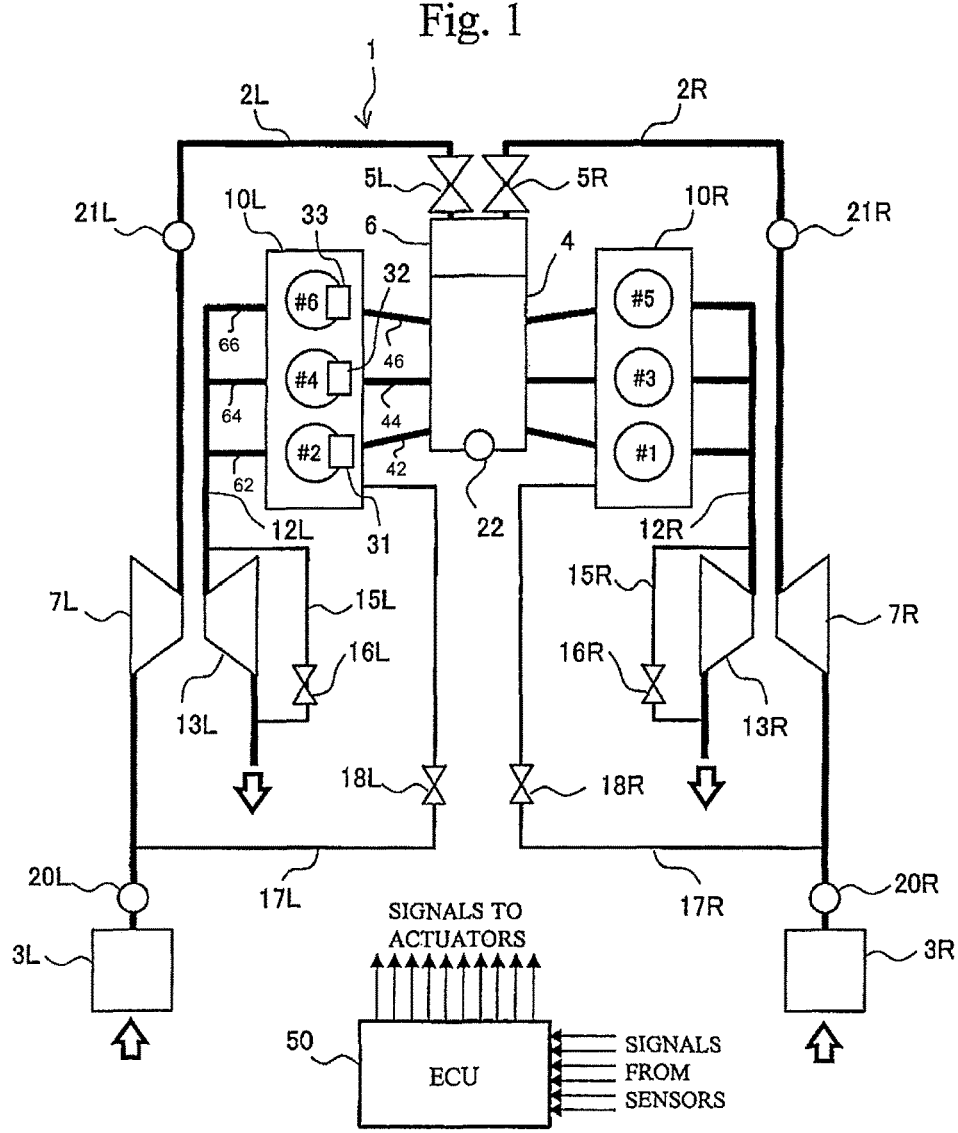
FIG. 1 is a diagram for explaining a configuration of an engine system of an embodiment of the present application.

FIG. 1 is a diagram for explaining a configuration of an engine system of an embodiment of the present application. As shown in FIG. 1, the engine system of the present embodiment includes a supercharged engine 1 and a control device 50. The supercharged engine 1 is a V type six cylinder engine that has a left bank 10L and a right bank 10R, wherein three cylinders are placed in each of the banks 10L and 10R. A second cylinder #2, a fourth cylinder #4 and a sixth cylinder #6 that are placed in the left bank 10L configure a first cylinder group. And a first cylinder #1, a third cylinder #3 and a fifth cylinder #5 that are placed in the right bank 10R configure a second cylinder group. In the explanation of the embodiment that follows, the left bank 10L and the first cylinder group are synonymous, and the right bank 10R and the second cylinder group are synonymous. Further, in the explanation of the embodiment that follows, the same components and members that are provided to correspond to the left bank 10L and the right bank 10R respectively are expressed by adding a suffix "L" or "R" to identical numerals.

In the present embodiment, the supercharged engine 1 is configured as a spark-ignition type in-cylinder direct injection engine. An ignition plug (not shown) and an in-cylinder injection valve (not shown) are mounted to each cylinder. Further, in the cylinders #2, #4 and #6 in the left bank 10L, variable valve lift devices 31, 32 and 33 that can change lift amounts of intake valves are provided. The variable valve lift devices 31, 32 and 33 also function as cylinder stopping mechanisms that stop operation of the cylinders by making the lift amounts of the intake valves zero. When the lift amounts of the intake valves are made zero, fuel injection and ignition are also stopped together. Further, the variable valve lift devices 31, 32 and 33 can be operated independently from one another. For example, while the variable valve lift devices 31 and 32 of the cylinders #2 and #4 stop the intake valves of their respective cylinder, only the variable valve lift device 33 of the cylinder #6 can lift the intake valves of its respective cylinder.

Intake systems of the supercharged engine 1 will be described. The left bank 10L and the right bank 10R are connected to a common surge tank (a common intake passage) 4. The surge tank 4 is integrated with an intake manifold that distributes air to each of the cylinders in the left bank 10L and each of the cylinders in the right bank 10R. Further, a water-cooling type intercooler 6 that cools the air that enters the surge tank 4, and a pressure sensor 22 for measuring intake pressure are attached to the surge tank 4.

The surge tank 4 is formed by gathering two intake passages 2L and 2R. The two intake passages 2L and 2R are respectively provided with electronically controlled throttles 5L and 5R. A compressor 7L of a turbocharger is provided on an upstream side of the throttle 5L in the intake passage 2L. Likewise, a compressor 7R of a turbocharger is also provided on an upstream side of the throttle 5R in the intake passage 2R. A pressure sensor 21L for measuring supercharging pressure is provided between the compressor 7L and the throttle 5L in the intake passage 2L, and a pressure sensor 21R for measuring supercharging pressure is provided between the compressor 7R and the throttle 5R in the intake passage 2R. An air cleaner 3L, and an air flow meter 20L that output a signal corresponding to a flow rate of air which is taken, are provided where the air is taken into the intake passage 2L. And an air cleaner 3R, and an air flow meter 20R that output a signal corresponding to a flow rate of air which is taken, are provided where the air is taken into the intake passage 2R.

A blow-by gas passage 17L for returning blow-by gas that is generated in an engine block to an intake system are connected to a portion between the air flow meter 20L and the compressor 7L in the intake passage 2L. And a blow-by gas passage 17R for returning blow-by gas that is generated in an engine block to an intake system are connected to a portion between the air flow meter 20R and the compressor 7R in the intake passage 2R. A compression control valve 18L is provided in the blow-by gas passage 17L, and a compression control valve 18R is provided in the blow-by gas passage 17R.

Next, an exhaust system of the supercharged engine 1 will be described. An exhaust passage 12L is connected to the left bank 10L, and an exhaust passage 12R is connected to the right bank 10R. A turbine 13L of the turbocharger is provided in the exhaust passage 12L. The turbine 13L is paired with (has a one to one relationship with and is connected to) the compressor 7L, and drives the compressor 7L by receiving exhaust gas energy of the left bank 10L. Further, in the exhaust passage 12L, a bypass passage 15L that bypasses the turbine 13L is provided, and a wastegate valve 16L is placed in the bypass passage 15L. Likewise, in the exhaust passage 12R, a turbine 13R of the turbocharger is provided, and a bypass passage 15R that bypasses the turbine 13R is provided. A wastegate valve 16R is placed in the bypass passage 15R. The turbine 13R is paired with (has a one to one relationship with and is connected to) the compressor 7R, and drives the compressor 7R by receiving exhaust gas energy of the right bank 10R. Note that the wastegate valves 16L and 16R are diaphragm type valves that are driven by negative pressure, or electric valves that are driven by motors, and are controlled to any desired opening degree by duty control.

The supercharged engine 1 which is configured as above is controlled by the control device 50. The control device 50 is an ECU (Electronic Control Unit). The control device 50 has at least an input/output interface, a ROM, a RAM and a CPU. The input/output interface is provided to take in sensor signals from various sensors that are attached to the supercharged engine 1 and a vehicle, and to output operation signals to actuators included in the supercharged engine 1. The sensors from which the control device 50 takes in the signals include an air-fuel ratio sensor, an accelerator pedal sensor, a crank angle sensor, an ambient pressure sensor and the like (not shown), in addition to the pressure sensors 21L, 21R and 22, and the air flow meters 20L and 20R that are described above. The actuators to which the control device 50 outputs the operation signals include an ignition device, a fuel injection device, a variable valve timing device and the like (not shown), in addition to the throttles 5L and 5R, the wastegate valves 16L and 16R and the variable valve lift devices 31, 32 and 33. In the ROM, various control programs for controlling the supercharged engine 1 and maps are stored. The CPU reads the control programs from the ROM and executes the control programs, and generates the operation signals based on the sensor signals which are taken in.

2. Engine Control of an Embodiment 2-1. Reduced Cylinder Operation

Figure 2:
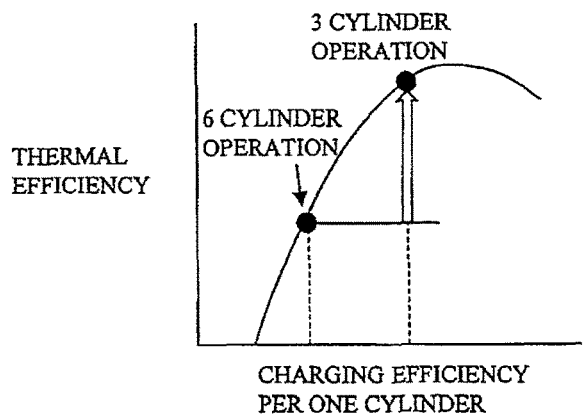
FIG. 2 is a diagram showing fuel efficiency effect of reduced cylinder operation.

The control programs executed by the control device 50 include a control program for the reduced cylinder operation. The reduced cylinder operation of the supercharged engine 1 is achieved by stopping the intake valves in a closed state by the variable valve lift devices 31, 32 and 33 and stopping the fuel injection and the ignition in the left bank 10L to stop the three cylinders in the left bank 10L. Thereby, the number of operating cylinders in the supercharged engine 1 is decreased from 6 to 3. FIG. 2 is a diagram showing fuel efficiency effect of the reduced cylinder operation. As shown in FIG. 2, the number of the operating cylinders is decreased from 6 to 3 by the reduced cylinder operation, whereby charging efficiency per one cylinder which is required to obtain equal torque becomes large. When the charging efficiency becomes larger, pumping loss of the operating cylinders decreases, and thermal efficiency of the engine as a whole is enhanced. As a result, the fuel efficiency is increased by performing the reduced cylinder operation. An operating region where the reduced cylinder operation is performed is set in a map in which load torque and engine speed are parameters.

When the operation of the cylinders in the left bank 10L is stopped by the reduced cylinder operation, the exhaust gas energy which is supplied to the turbine 13L decreases, and drive force of the turbine 13L rotationally driving the compressor 7L is decreased. Therefore, when the operating region of the supercharged engine 1 is in a supercharging region, and the pressure in the surge tank 4 is larger than ambient pressure, there is a fear that a backflow of air through the compressor 7L occurs. The backflow of the air releases the blow-by gas, which is introduced into the intake passage 2L through the blow-by gas passage 17L, into the atmosphere. Further, if the air flow meter 20L is a hot-wire type air flow meter, the air flow meter 20L measures the backflow of the air, and therefore there is a fear that an air amount in the cylinder is erroneously estimated, an air-fuel ratio is made excessively rich, and a misfire is caused thereby. In order to prevent the backflow the of air which causes a problem like this, if the reduced cylinder operation is performed, backflow restraining control that will be described as follows is executed in combination.

2-2. Backflow Restraining Control

Figure 3:
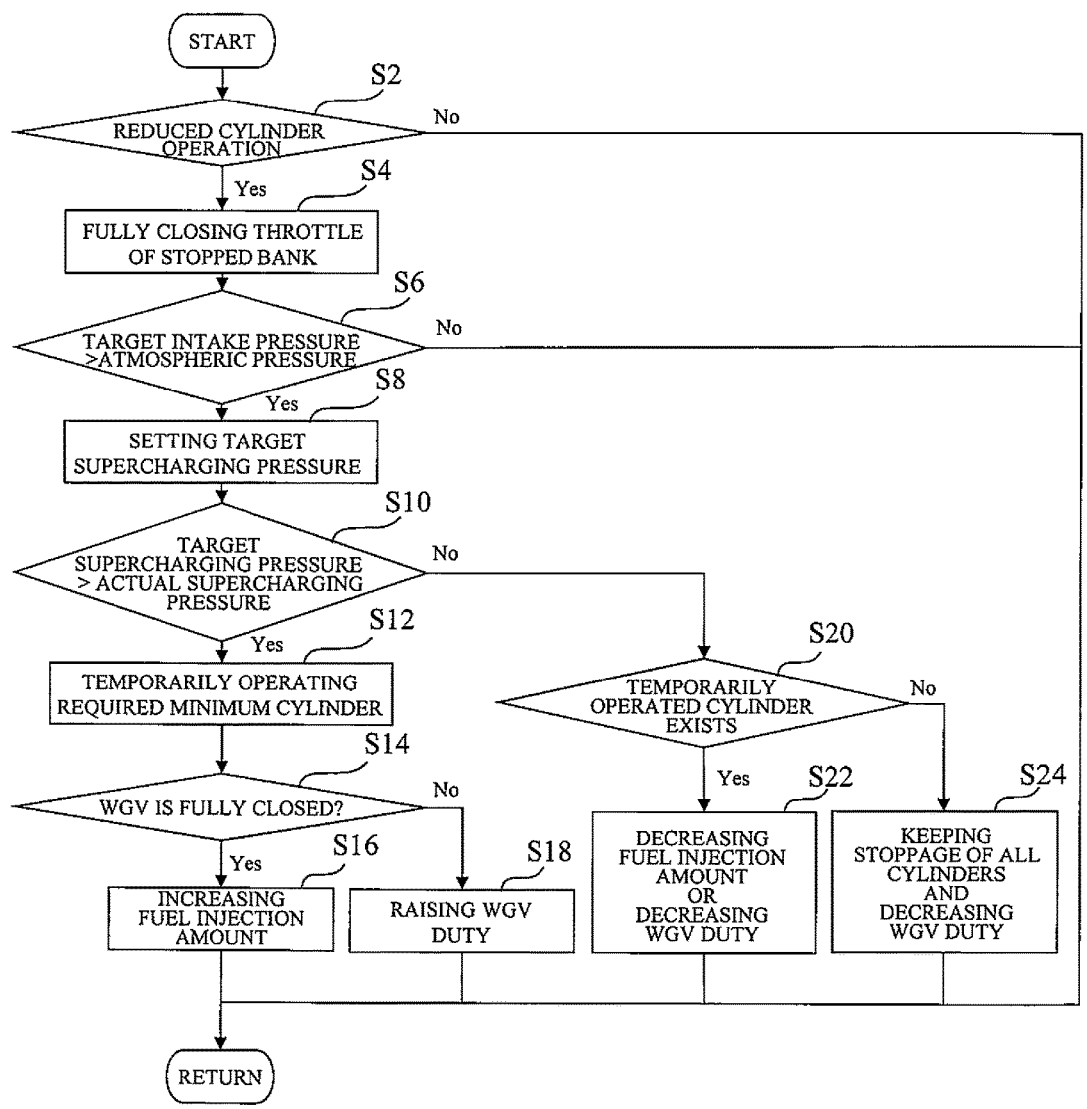
FIG. 3 is a flowchart showing a routine of backflow restraining control that is executed in the engine system of the embodiment of the present application.

FIG. 3 is a flowchart showing a routine of the backflow restraining control which is executed by the control device 50. The routine of the backflow restraining control shown in the flowchart is repeatedly executed at predetermined control periods corresponding to a clock frequency of the control device 50.

In step S2, it is determined whether the reduced cylinder operation is performed at present. If the reduced cylinder operation is not performed, the backflow of the air does not occur. Therefore, in this case, processes following step S2 are all skipped, and the present routine is ended.

When the reduced cylinder operation is performed, a process in step S4 is performed. In step S4, the operation of the left bank 10L is stopped, and the throttle 5L corresponding to the left bank 10L is fixed to a fully closed state. The throttle 5L is located downstream of the compressor 7L, wherein there is the fear that the backflow of the air through the compressor 7L occurs. Because the throttle 5L is fully closed, even if pressure difference exists between the upstream side and a downstream side of the throttle 5L, an air flow between the surge tank 4 and the intake passage 2L is restrained to a minimum. Fixation of the throttle 5L to the fully closed state is cancelled when the operation is returned from the reduced cylinder operation to all cylinder operation.

Next, in step S6, it is determined whether target intake pressure is larger than the ambient pressure. The fact that the target intake pressure is greater than the ambient pressure indicates that a target operation point determined on the basis of the load torque and the engine speed is in the supercharging region. Target torque per cylinder of the operating cylinders is calculated in accordance with the number of the operating cylinders based on the load torque to the supercharged engine 1. If the load torque to the supercharged engine 1 is constant, when the operation is switched from all-cylinder operation to reduced cylinder operation, the target torque of the operating cylinders is essentially doubled. A target air amount is calculated on the basis of the target torque, wherein the target air amount is a target value of an in-cylinder air amount. Target intake pressure is calculated on the basis of the target air amount, wherein the target intake pressure is a target value of the intake pressure (the pressure in the surge tank 4). An opening degree of the throttle 5L when the all-cylinder operation is performed, an opening degree of the throttle 5R when the all-cylinder operation is performed, and the opening degree of the throttle 5R when the reduced cylinder operation is performed are calculated based on the target intake pressure.

When the target intake pressure is greater than the ambient pressure, step S8 is performed. In step S8, target supercharging pressure is set, wherein the target supercharging pressure is a target value of pressure in a space between the compressor 7L and the throttle 5L. The target supercharging pressure is set at a minimum value, such that air does not flow back from the downstream side of the throttle 5L to the upstream side of the throttle 5L. More specifically, the target supercharging pressure is set at a value, which is larger by a predetermined value a than the intake pressure measured by the pressure sensor 22. The predetermined value a is a margin for preventing the backflow, and is set at a value of 0 to approximately 5 kPa depending on control precision of the supercharging pressure. From a viewpoint of fuel efficiency, the value a is preferably small.

Next, in step S10, the target supercharging pressure which is set in step S8, and actual supercharging pressure that is measured by the pressure sensor 21L are compared. If the actual supercharging pressure is equal to or greater than the target supercharging pressure, possibility of the air flowing backward from the downstream side of the throttle 5L to the upstream side of the throttle 5L is low. However, if the actual supercharging pressure is lower than the target supercharging pressure, there is a possibility that the air may flow back to the upstream side of the throttle 5L from the downstream side of the throttle 5L, and furthermore, there is a possibility that the backflow of the air through the compressor 7L may occur.

When the actual supercharging pressure is lower than the target supercharging pressure, step S12 is performed. In step S12, although the operation of the cylinders in the left bank 10L is stopped, a required minimum number of cylinders in the left bank 10L is temporarily operated. Preferably, only one cylinder is temporarily operated. For example, the variable valve lift device 33 is operated in order to temporarily operate only the cylinder #6 while the operation of the cylinders #2 and #4 is stopped. If there is a cylinder that is already operated, an operating state of the cylinder is kept. At least one of the cylinders is operated, whereby exhaust gas having higher energy flows into the exhaust passage 12L connected to the left bank 10L than if all of the cylinders in the left bank 10L are stopped. Consequently, the exhaust gas energy which is supplied to the turbine 13L increases, whereby increase in rotational speed of the compressor 7L is promoted. Thereby, the pressure of the upstream side of the throttle 5L, that is, the actual supercharging pressure which is measured by the pressure sensor 21L increases.

The cylinder which is temporarily operated in step S12 is operated with an objective of increasing the exhaust gas energy which is supplied to the turbine 13L to rotate the compressor 7L. Since a flow rate of the air which passes through the throttle 5L is restrained to the minimum by the fixation of the throttle 5L to the fully closed state, the energy necessary to increase the rotational speed of the compressor 7L, that is, the exhaust gas energy to be supplied to the turbine 13L, can be small. Therefore, as compared with the cylinders in the right bank 10R which are operated to generate torque which is required in the supercharged engine 1, a fuel injection amount of the cylinder, which is temporarily operated, in the left bank 10L is kept low. If the exhaust gas energy is sufficiently obtained, at least one of the cylinders may be operated only once in a plurality of engine rotational cycles.

A basic value of the fuel injection amount of the cylinder, which is temporarily operated, in the left bank 10L is stored in a map with ignition timing and the lift amounts of the intake valves. In more detail, the ignition timing of the cylinder which is temporarily operated is set at MBT (Minimum Advance for Best Torque) or trace knock ignition timing, from a viewpoint of fuel efficiency performance. However, in order to enhance a conversion rate of energy of injected fuel to the exhaust gas energy, the ignition timing may be retarded from MBT. The lift amounts of the intake valves of the cylinder which is temporarily operated is set at minimum lift amounts capable of obtaining the air amount within a range in which the misfire does not occur in relation with the fuel injection amount.

Next, in step S14, it is determined whether the wastegate valve 16L provided in the exhaust passage 12L corresponding to the left bank 10L is fully closed. Use efficiency in the turbine 13L of the exhaust gas energy, which is obtained by temporarily operating the cylinder in the left bank 10L, becomes a maximum when the wastegate valve 16L is fully closed. Therefore, by fully closing the wastegate valve 16L, the fuel injection amount of the cylinder which is temporarily operated can be kept low. The basic value of the fuel injection amount which is stored in the above described map is set on a precondition that the wastegate valve 16L is fully closed.

When the wastegate valve 16L is not fully closed, step S18 is executed. In normal operation, the wastegate valve 16L is fully closed when abrupt acceleration is executed, and therefore, the result of a first determination in step S14 is negative. In step S18, drive duty of the wastegate valve 16L is raised so as to fully close the wastegate valve 16L.

Meanwhile, when the wastegate valve 16L is fully closed, step S16 is executed. In step S16, the fuel injection amount of the cylinder which is temporarily operated is corrected to increase in accordance with a difference between the target supercharging pressure which is set in step S8, and the actual supercharging pressure which is measured by the pressure sensor 21L, by proportional-integral (PI) control of the difference, for example. The fuel injection amount is increased, whereby the exhaust gas energy is further increased, and the rotational speed of the compressor 7L further increases. Thereby, the actual supercharging pressure is increased to reach the target supercharging pressure.

Subsequently, when the actual supercharging pressure is equal to or larger than the target supercharging pressure determined in step S10, determination in step S20 is performed. In step S20, it is determined whether or not a cylinder, which is temporarily operated, exists in the left bank 10L. When the cylinder which is temporarily operated exists, a process in step S22 is performed. When the cylinder which is temporarily operated does not exist, a process in step S24 is performed.

In step S22, the fuel injection amount of the cylinder which is temporarily operated is corrected to decrease in accordance with the difference between the target supercharging pressure which is set in step S8 and the actual supercharging pressure which is measured by the pressure sensor 21L, by PI control of the difference, for example. When the fuel injection amount reaches a lower limit value, the drive duty of the wastegate valve 16L is decreased so as to open the wastegate valve 16L. By this process, reduction in the fuel efficiency can be limited, even if the cylinder is temporarily operated.

In step S24, stoppage of all cylinders in the left bank 10L is continued. Further, the drive duty of the wastegate valve 16L is continually decreased.

If the target intake pressure is equal to or lower than the ambient pressure when determination in step S6 is executed, the backflow of air does not occur even when the reduced cylinder operation is performed. Therefore, if the target intake pressure is equal to or lower than the ambient pressure, the following processes are all skipped, and the present routine is ended. Thereby, the cylinder, which the reduced cylinder operation is applied to, is not wastefully operated, and therefore, the fuel efficiency can be increased.

The backflow restraining control described above is executed in combination with the reduced cylinder operation, whereby the rotational speed of the compressor 7L can be increased and the backflow of air can be restrained while fuel efficiency increasing effect by the reduced cylinder operation is maintained. Thereby, the reduced cylinder operation can be performed in a wide operating region including the supercharging region. Hereinafter, the operating region where the reduced cylinder operation is performed in the present embodiment, and concrete operation of the supercharged engine in the operating region where the reduced cylinder operation is performed will be described.

Figure 4:
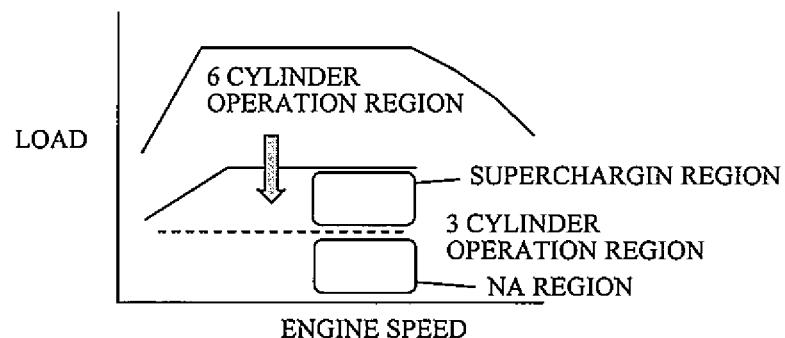
FIG. 4 is a diagram showing movement of a target operation point from a six cylinder operating region to a three cylinder supercharging operating region by deceleration.
Figure 6:
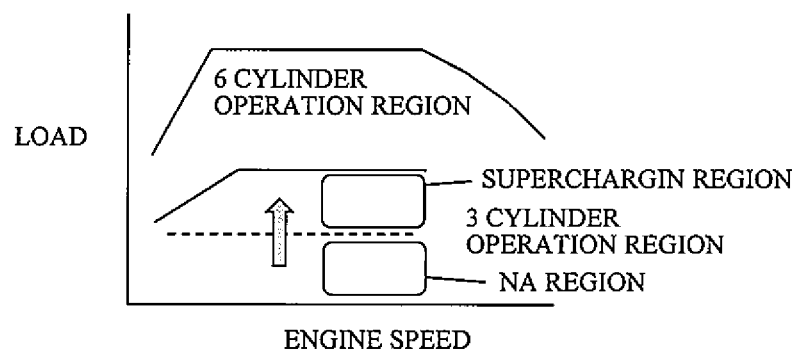
FIG. 6 is a diagram showing the movement of the target operation point from a three cylinder NA operating region to the three cylinder supercharging operating region by acceleration.

3. Operation of Supercharged Engine in an Embodiment 3-1. Setting of Operating Region of Supercharged Engine FIGS. 4 and 6 are diagrams showing a setting of the operating region of the supercharged engine 1. The operation of the supercharged engine 1 is performed in accordance with the operating region which is set on a two-dimensional plane in which the load torque and the engine speed are set as axes. In each of the examples shown in FIGS. 4 and 6, a low to medium load region is set as the operating region where a three cylinder, reduced-cylinder operation is performed (a three cylinder operating region). A high load region is set as the operating region where a six cylinder operation that operates all the cylinders is performed (a six cylinder operating region). Furthermore, the three cylinder operating region is divided into the supercharging region where supercharging is performed by the compressor 7R, and a natural aspiration (NA) operating region where the supercharging is not performed (a natural aspiration operating region).

Request engine output is determined on the basis of an accelerator pedal opening degree, and the load torque with respect to the supercharged engine 1 is determined on the basis of the request engine output and the engine speed. An operation point that is determined on the basis of the load torque and the engine speed is the target operation point of the supercharged engine 1. Control content of the supercharged engine 1 is determined on the basis of which operating region the target operation point is located in, and which route the target operation point moves along.

Figure 5:
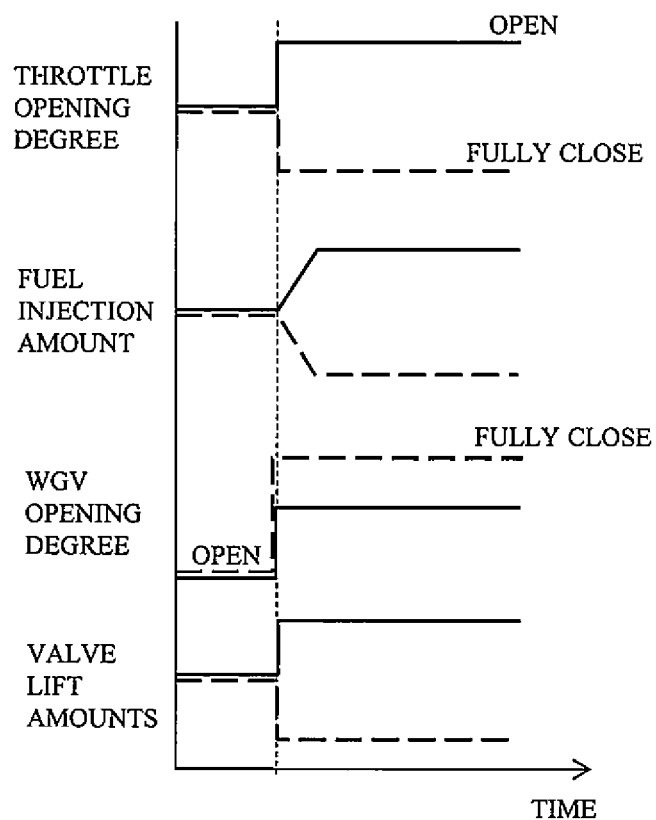
FIG. 5 is a time chart showing operation of a supercharged engine in an example of a shift from six cylinder operation to three cylinder supercharging operation.

3-2. Operation at Time of Shift from a Six Cylinder Operating Region to a Three Cylinder Supercharging Operating Region When the supercharged engine 1 is operated in the six cylinder operating region, if the load torque with respect to the supercharged engine 1 is decreased by a deceleration request of an operator, the target operation point of the supercharged engine 1 moves from the six cylinder operating region to the three cylinder supercharging operating region, as shown by an arrow in FIG. 4, in an example. FIG. 5 shows the operation of the supercharged engine 1 in this example by means of a time chart.

In FIG. 5, change of respective operation amounts of the supercharged engine 1 in accordance with time in a case of a shift from the six cylinder operation to three cylinder supercharging operation is drawn. The operation amounts are throttle opening degree, the fuel injection amount, wastegate valve opening degree (WGV opening degree) and valve lift amounts of the intake valves. In FIG. 5, the change of the operation amounts drawn in solid lines corresponds to the operation amounts relating to the right bank 10R which the reduced cylinder operation is not applied to, and the change of the operation amounts drawn in broken lines corresponds to the operation amounts relating to the left bank 10L which the reduced cylinder operation is applied to.

When the operation is shifted from the six cylinder operation to the three cylinder supercharging operation, the backflow restraining control is executed simultaneously with a start of the reduced cylinder operation. The throttle 5R is opened to an opening degree necessary to realize the target air amount as shown by a solid line. Meanwhile, the opening degree of the throttle 5L is fully closed by the backflow restraining control as shown by a broken line.

The fuel injection amount of the right bank 10R is increased at a rate corresponding to a response of the air amount to the change of the opening degree of the throttle 5R so that the air-fuel ratio is kept stoichiometric, as shown by a solid line. The fuel injection amount of the left bank 10L is decreased at a rate corresponding to a response of the air amount to the change of the opening degree of the throttle 5L so that the air-fuel ratio is kept stoichiometric, as shown by a broken line. A final fuel injection amount of the left bank 10L is regulated to a fuel injection amount that can supply the turbine 13L with the exhaust gas energy that can rotate the compressor 7L to such an extent as to prevent the backflow of the air.

The opening degree of the wastegate valve 16R is closed to an opening degree necessary to realize the target air amount, as shown by a solid line. The opening degree of the wastegate valve 16L is fully closed by the backflow restraining control, as shown by a broken line.

The valve lift amounts of the right bank 10R are increased in accordance with increase in the target air amount, as shown in a solid line. The valve lift amounts of the left bank 10L are reduced to the minimum lift amounts within the range in which the air amount can be obtained that does not cause misfire in relation with the fuel injection amount.

Figure 7:
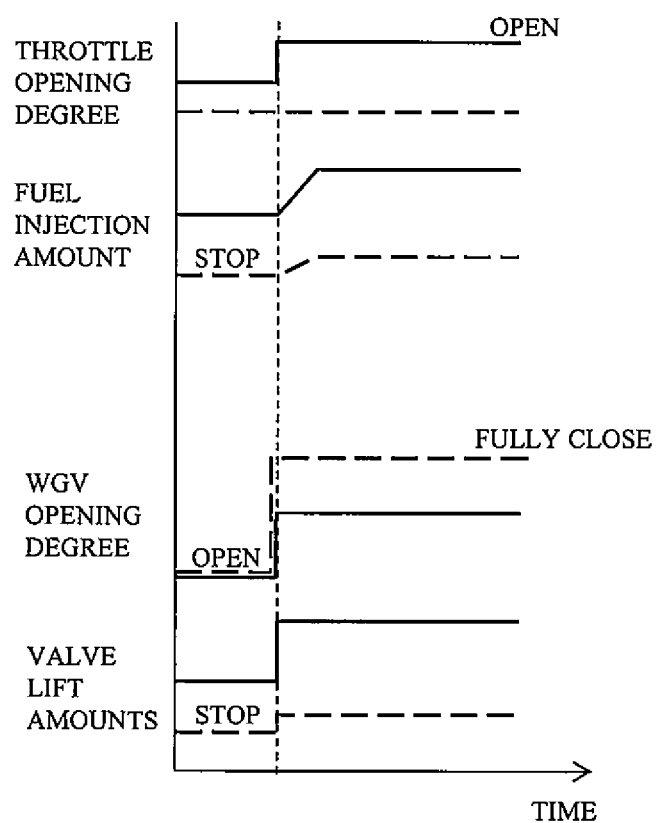
FIG. 7 is a time chart showing the operation of the supercharged engine in an example of a shift from three cylinder NA operation to the three cylinder supercharging operation.

3-3. Operation at Time of Shift from Three Cylinder NA Operating Region to Three Cylinder Supercharging Operating Region When the supercharged engine 1 is operated in the three cylinder NA operating region, if the load torque with respect to the supercharged engine 1 is increased by an acceleration request of the operator, the target operation point of the supercharged engine 1 moves from the three cylinder NA operating region to the three cylinder supercharging operating region, as shown by an arrow in FIG. 6, in an example. FIG. 7 shows the operation of the supercharged engine 1 in this example by means of a time chart.

In FIG. 7, change of the respective operation amounts of the supercharged engine 1 in accordance with time in a case of a shift from three cylinder NA operation to the three cylinder supercharging operation is drawn. The operation amounts are the throttle opening degree, the fuel injection amount, the wastegate valve opening degree (the WGV opening degree) and the valve lift amounts of the intake valves. In FIG. 7, the change of the operation amounts drawn in solid lines corresponds to the operation amounts relating to the right bank 10R, which the reduced cylinder operation is not applied to, and the change of the operation amounts drawn in broken lines corresponds to the operation amounts relating to the left bank 10L, which the reduced cylinder operation is applied to.

When the operation is shifted from the three cylinder NA operation to the three cylinder supercharging operation, the backflow restraining control is executed simultaneously with the shift. The the throttle 5R is opened to an opening degree necessary to realize the target air amount as shown by a solid line. Meanwhile, the throttle opening degree of the throttle 5L is maintained fully closed as shown by a broken line.

The fuel injection amount of the right bank 10R is increased at the rate corresponding to the response of the air amount to the change of the opening degree of the throttle 5R so that the air-fuel ratio is kept stoichiometric as shown by a solid line. With respect to the left bank 10L, the fuel injection is stopped in the three cylinder NA operation, and then the fuel injection is executed in the three cylinder supercharging operation, as shown by a broken line. The fuel injection of the left bank 10L is regulated to the fuel injection amount that can supply the turbine 13L with the exhaust gas energy that can rotate the compressor 7L to the extent to prevent the backflow of air.

The wastegate valve 16R is closed to the opening degree necessary to realize the target air amount, as shown by a solid line. The opening degree of the wastegate valve 16L is fully closed by the backflow restraining control, as shown by a broken line.

The valve lift amounts of the right bank 10R are increased in accordance with the increase in the target air amount, as shown in a solid line. With respect to the left bank 10L, a valve lift is stopped in the three cylinder NA operation, and then the valve lift is performed in the three cylinder supercharging operation, as shown with a broken line. The valve lift amount of the left bank 10L in the three cylinder supercharging operation is set at the minimum lift amount within the range in which the air amount can be obtained that does not cause the misfire in relation with the fuel injection amount.

4. Miscellaneous

In the aforementioned embodiment, the control device 50 executes the routine of the backflow restraining control shown in FIG. 3, whereby "throttle operating portion" and "pressure control portion" according to the present application are realized. In particular, the process in step S4 corresponds to a function of the "throttle operating portion", and the process in step S6 and the following processes correspond to a function of the "pressure control portion".

In the aforementioned embodiment, the wastegate valve is provided as the actuator which regulates the exhaust gas energy to be supplied to the turbine, but a variable nozzle can be also used instead of the wastegate valve. Further, the supercharged engine to which the control device of the present application is applied may be a diesel engine. Further, the supercharged engine to which the control device of the present application is applied may be a V type engine with more cylinders such as a V-type 8 cylinder engine or a V-type 12 cylinder engine, or may be a horizontally opposed engine such as a horizontally opposed four cylinder engine and a horizontally opposed six cylinder engine. In each of these engines, left and right banks can be made cylinder groups respectively. The control device of the present application can be applied to even an in-line four cylinder engine or an in-line six cylinder engine, if a plurality of turbochargers are provided in parallel. That is to say, if the plurality of turbochargers are provided in one bank, a plurality of cylinder groups can be set in said one bank.

Further, in the aforementioned embodiment, the lift amounts of the intake valves are made zero when the operation of the cylinders is stopped, and at this time, preferably, lift amounts of exhaust valves are also made zero. In order to restrain the pumping loss to a minimum, preferably, the lifts amounts of both the intake valves and the exhaust valves are made zero, that is, both the intake valves and the exhaust valves are stopped in a closed state. However, in order to stop a flow of gas from the intake passage to the exhaust passage, only the intake valves may be stopped in the closed state, or only the exhaust valves may be stopped in the closed state.

What is claimed is:

1. A supercharged engine comprising:
a plurality of cylinders that are grouped into a plurality of cylinder groups, each of the plurality of cylinders having an intake valve and an exhaust value,
a plurality of intake passages provided independently from one another, a number of the intake passages being equal to a number of the cylinder groups,
a plurality of exhaust passages having a one to one relationship with the cylinder groups,
a plurality of compressors, each of the compressors being provided in each of the intake passages,
a plurality of turbines having a one to one relationship with the compressors and connected to the compressors, each of the turbines being provided in each of the exhaust passages,
a plurality of throttles located downstream of the compressors, each of the throttles being provided in each of the intake passages,
a common intake passage formed by gathering the intake passages on a downstream side of the throttles, and commonly shared among the cylinder groups,
a first pressure sensor configured to measure pressure upstream of the plurality of throttles and a second pressure sensor configured to measure pressure downstream of the plurality of throttles, and
a control device,
wherein the control device is configured to execute reduced cylinder operation, and while the reduced cylinder operation is executed, fuel injection with respect to at least one of the cylinder groups is stopped, and at least one of the intake valves and the exhaust valves of said at least one of the cylinder groups are stopped in a closed state,
wherein the control device
is configured to operate one of the plurality of throttles to a fully closed state while the reduced cylinder operation is executed, wherein the one of the plurality of throttles is located downstream of one of the plurality of compressors, the one of the plurality of compressors is driven by one of the plurality of turbines, the one of the plurality of turbines is provided in one of the plurality of exhaust passages, exhaust gas of one of the plurality of cylinder groups flows through the one of the plurality of exhaust passages; and
wherein the control device is configured, while the reduced cylinder operation is executed, and in response to the pressure of an upstream side of the one of the plurality of throttles being smaller than the pressure of a downstream side of the one of the plurality of throttles, to operate at least one cylinder, which is included in the one of the plurality of cylinder groups, and control an amount of fuel injection with respect to the at least one cylinder to be less than an amount of fuel injection with respect to a second cylinder which has not been stopped, to increase exhaust gas energy which is supplied to the one of the plurality of turbines to increase rotational speed of the one of the plurality of compressors, so that the pressure of the upstream side of the one of the plurality of throttles is controlled to be equal to or greater than the pressure of the downstream side of the one of the plurality of throttles.

2. The supercharged engine according to claim 1, wherein the control device controls the pressure of the upstream side of the one of the plurality of throttles to be equal to the pressure of the downstream side of the one of the plurality of throttles.

3. The supercharged engine according to claim 1, wherein the supercharged engine further comprises an actuator that is provided in the one of the plurality of exhaust passages, the actuator being configured to regulate the exhaust gas energy supplied to the one of the plurality of turbines, and wherein
the control device is configured to operate the actuator so that the exhaust gas energy supplied to the one of the plurality of turbines becomes a maximum while the pressure control portion operates said at least one cylinder included in the one of the plurality of cylinder groups.

4. The supercharged engine according to claim 1, wherein the control device is configured to regulate the amount of the fuel injection with respect to said at least one cylinder included in the one of the plurality of cylinder groups in accordance with a difference between a measured value of the pressure of the upstream side of the one of the plurality of throttles and a target value, wherein the target value is set to be equal to or greater than a value of the pressure of the downstream side of the one of the plurality of throttles.

5. The supercharged engine according to claim 1, wherein the control device is configured to operate said at least one cylinder included in the one of the plurality of cylinder groups, while the pressure of the downstream side of the one of the plurality of throttles is equal to or greater than ambient pressure, and wherein
the control device is configured to continue preventing operation of all cylinders included in the one of the plurality of cylinder groups, while the pressure of the downstream side of the one of the plurality of throttles is less than the ambient pressure.

* * * * *